Sept. 6, 1955  J. D. STAPLES  2,716,819
MEASURING WHEEL
Filed Nov. 26, 1952  2 Sheets-Sheet 2
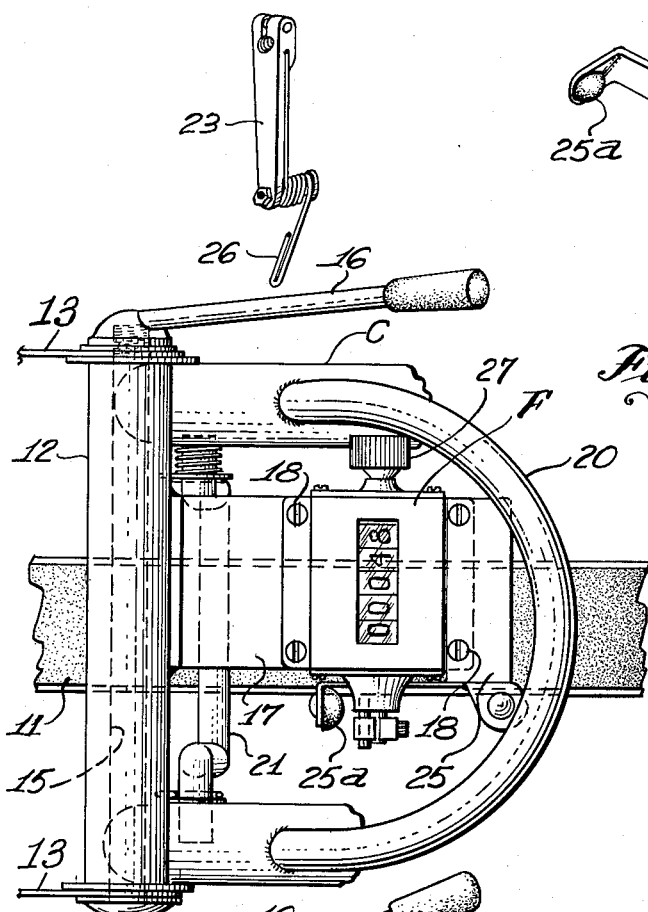
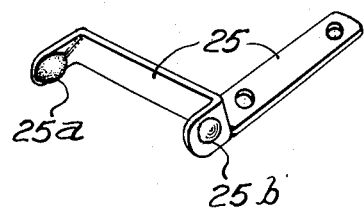
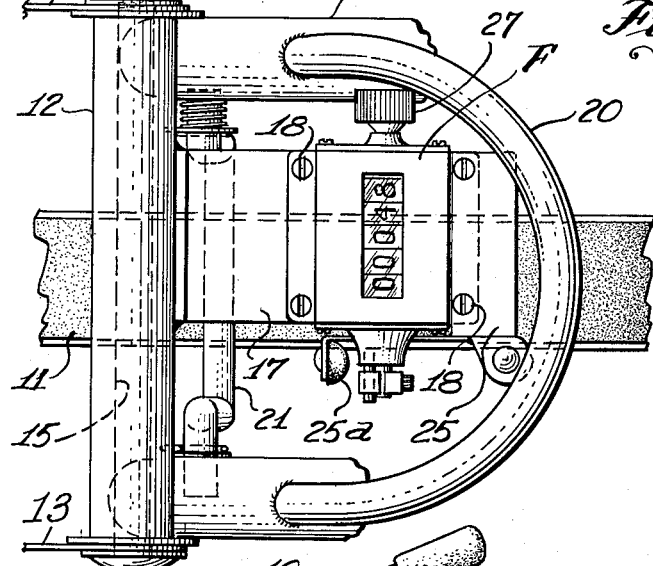
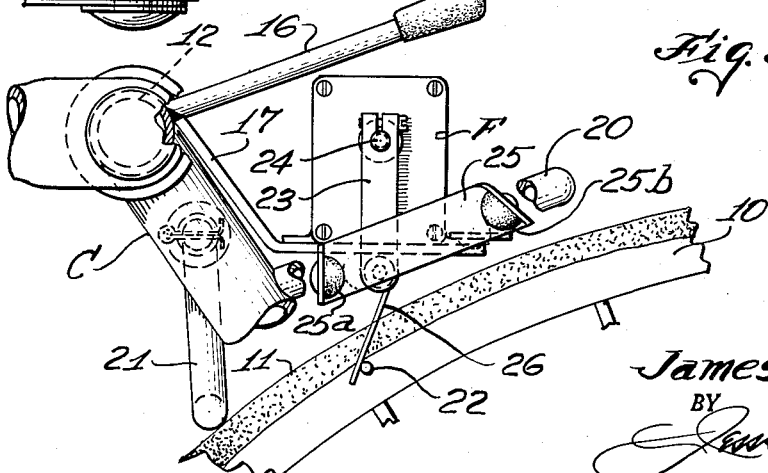
INVENTOR.
James D. Staples

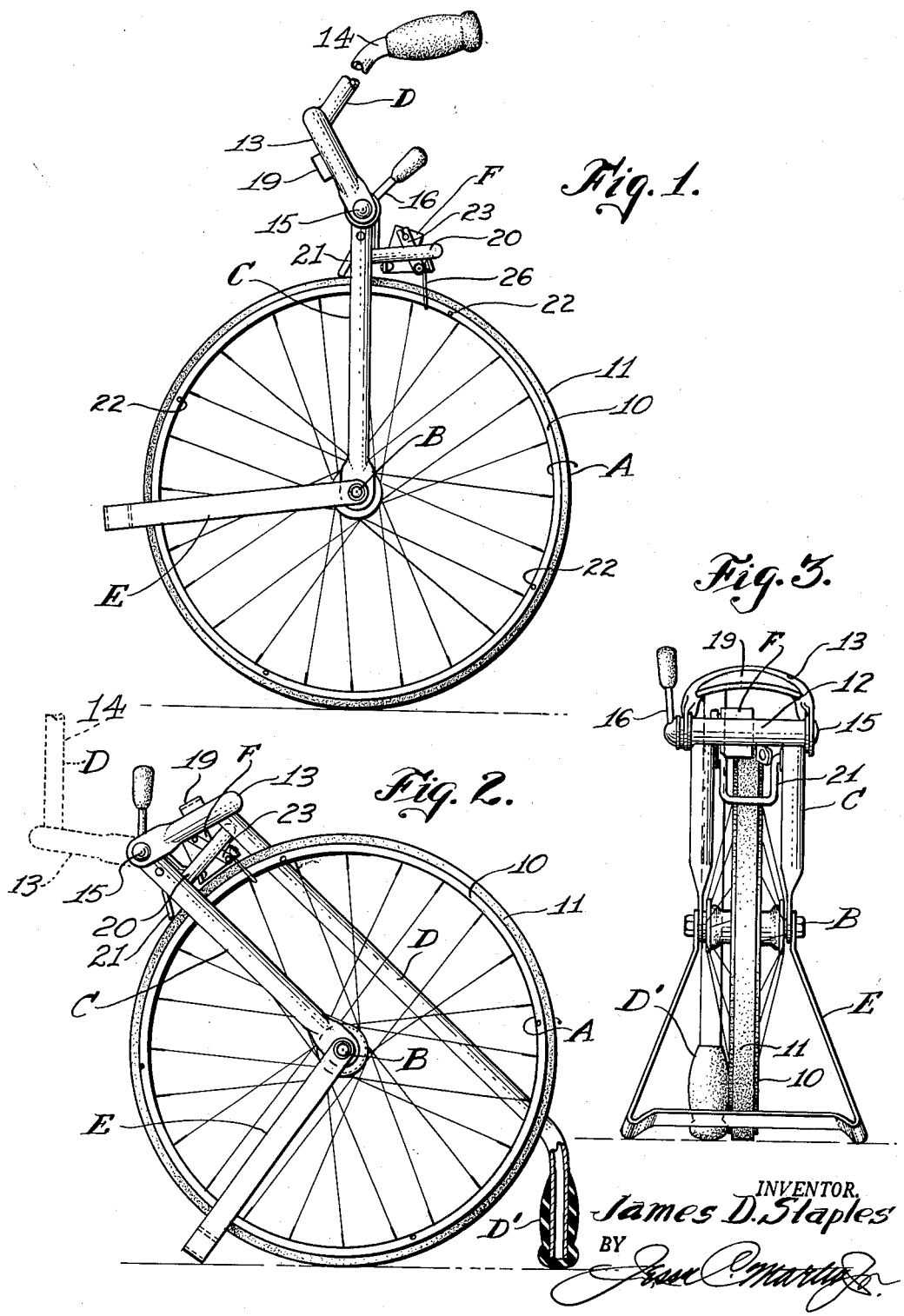

United States Patent Office 2,716,819
Patented Sept. 6, 1955

2,716,819

MEASURING WHEEL

James D. Staples, Bell, Calif., assignor to Rolatape, Inc., Santa Monica, Calif., a corporation of California Application November 26, 1952, Serial No. 322,788

6 Claims. (Cl. 33—141)

The hereinafter described invention relates to instruments of the wheel type which are adapted to be rolled over a surface to be measured and whereby measurement of the distance traversed is recorded.

The present invention carries on beyond measuring wheels of the class through the provision of a structure by which long distance measurements can be expeditiously made, and over rough terrains, being particularly adapted for road, highway and cross country distance measurements, the layout of pipe lines, project locations, map checking, surveys, and with accuracy and less man hours than possible to effect by tape line or chain measurement as commonly employed for the purpose.

This invention has for its primary purpose the provision of a measuring wheel instrument which is characterized by the improvements and advantages as follows:

1. A measuring wheel unit wherein a measurement recording counter is mounted in close proximity to the periphery of the wheel and so that the counter is operated from the wheel rim by cooperating elements on the wheel rim which engage it, the engaging elements between the counter and wheel rim serving to trip the counter, and indicating the linear travel of the wheel in equal fractions of a revolution thereof. An advantage of this arrangement is that all gearing and/or movable transmission parts which have heretofore been employed between the wheel axle and the recording counter are eliminated thereby greatly simplifying the structure, reducing its cost and the cost of maintenance of movable transmission elements. Another advantage is that the recording counter is placed in a position with respect to the wheel so that it resides over the periphery of the wheel where it is fully visible to the wheel operator instead of being set to function from the wheel axle where it is difficult to observe the measurement reading.

2. A simple and efficient brake mechanism which is adapted to engage the wheel tread and which permits the wheel to traverse through the brake in the forward rolling movement of the wheel, but which automatically functions to prevent the rearward movement of the wheel, when the wheel is at rest and the recorded measurement is to be taken, that is, the wheel is rendered irreversible in its movement in a rearward direction which assures to the operator that he may start and stop the measurement at will without destroying the true reading of the recording counter. Otherwise expressed the brake may be said to provide an antireverse bar.

3. A simple and effective frame upon which the wheel is mounted, the frame providing the wheel forks and a stand which supports the wheel and permitting the operator to rest the instrument at any desired point so that logging of the measurement data can be made without loss of position of the wheel—the stand being joined to the wheel axle and clearing the wheel periphery during operation of the wheel.

4. An operating handle which is foldably joined to the upper portion of the wheel forks so that it may be moved and locked in any desired position with respect to the wheel tread and stand.

5. An operating handle which through its novel shape and adjustability in relation to the wheel forks makes possible the safe and efficient operation of the wheel unit from the open window of an automobile while the vehicle is operating at low speeds.

While there has been shown and described a specific embodiment of the improvements it should be understood that the invention is not limited to the exact details of construction set forth, and that same embraces such changes, modifications and equivalents of the parts and their formation and arrangement as come within the purview of the appended claims.

Fig. 1 is a side elevation of a measuring instrument embodying the present invention, with the wheel in starting position to carry out a measuring operation.

Fig. 2 is a side elevation of the instrument in folded out of service position and at rest on its supporting stand.

Fig. 3 is an end elevation of the folded instrument shown in Fig. 2.

Fig. 4 is an enlarged fragmentary plan view showing the measurement recording counter and the relation of the upper portion of the wheel framing members and their relation to the tread of the wheel tire.

Fig. 5 is an enlarged fragmentary side elevation of the instrument looking toward the operating side of the measurement recording counter, the wheel rim and the cooperating means between the wheel rim and the counter by which the recording counter is put into play in the traverse of the wheel over the terrain to be measured.

Fig. 6 is a detail view in perspective view showing the cooperating elements employed for operating the measurement counter from the wheel rim, while Fig. 7 is a perspective view of the bracket between which the wheel and counter connecting parts of Fig. 6 are held in functioning relation.

The illustrative embodiment of the invention shown in the accompanying drawings comprises a measuring wheel member A, mounted to rotate on the axle B, the wheel forks C, the wheel handle D joined to the forks, the stand E fixed to the axle B and by which the instrument is supported when at rest as on a terrain to be measured and the measurement recording counter F.

As here shown the wheel member A includes a spoked wheel and a wheel rim 10 with a tire of rubber or synthetic rubber 11 bonded to the rim and forming the tread of the wheel member A. The wheel tread thus formed provides good traction and its periphery is accurately calibrated to a given distance per revolution of the wheel.

In carrying out the purposes of the present invention which are primarily the measurement of long distance runs, it has been found, that measuring wheels made in accordance with the improvements of the invention provide practical measuring units when the wheel periphery measures from four to six feet. With this relatively long travel per revolution of the wheel a terrain of long distance can be expeditiously traversed and measured.

The wheel forks C are joined rigidly together at their upper ends by a cross member 12 which is positioned directly over the wheel tread. The cross member 12 provides a mounting for the handle D. It will be observed that the handle D is formed with a yoke 13 on one end and has a straight extending shaft portion 14 joined to the yoke 13 the shaft 14 terminating in a hand gripping member D. The yoke end of handle D is movably connected to the cross member 12 by the bolt 15 which passes through member 12. The bolt 15 is threaded on one end to receive the threaded handle 16 and by which the yoked end 13 of the handle D may be drawn up so as to tighten and secure the handle after its movement to the desired functioning, as well as the out of service, positions of the instrument. The arrangement in effect provides a hinge connection between the handle and the forks with means for locking the hinge after it is set. The purpose and advantages of this bolted hinge like connection between the yoke end 13 of the handle D and the cross member 12 of the wheel forks C will be hereinafter more fully explained.

Reference is now made to the measurement recording counter of the instrument and particularly to the location of the counter in respect to the tread of the wheel member A. In order that the counter be situated immediately over the wheel tread and closely adjacent thereto, a bracket 17 joined to the cross member 12 of the wheel forks C is adapted to receive and position the counter with its recording dial facing up, the counter being secured to the base of the bracket 17 by the screws 18. The counter F employed in the present embodiment of the invention is a standard type Veeder meter, readily obtainable in the market and known for its reliability in operation, although any equivalent measuring and recording device may be utilized.

Now referring to Fig. 2 it should be noted that the yoke 13 of handle D is so shaped that when the instrument of the invention is at rest and supported on its stand E and the handle brought down in fully folded position, the yoke 13 provides a protective guard over the counter F and that the yoke carries a cross strap 19 which resides immediately over the counter as a further protection therefor. As protection for the counter F during the operating position of the instrument as particularly shown in Fig. 1 when the yoke of the handle D does not encompass the counter as a guard, a member 20 secured to the upper ends of the wheel forks C is brought around the counter for this purpose.

As first herein disclosed one of the vital and important features and advantages of this invention resides in the means provided for preventing the wheel movement except in a forward rolling direction of the instrument, that is, to prevent the reversal of the wheel movement rearwardly during the measurement of a project and which should it take place would destroy the accuracy of the counter reading as well as cause the destruction of the counter and the cooperating elements by which it is put into play. To this end a brake 21 is movably mounted between the wheel forks C at the upper end thereof so that it will engage the face of the wheel tread 11 and in such manner that the wheel will readily pass through the brake in the forward rolling movement of the wheel but is fully prevented from rolling in the opposite rearward direction. The brake 21 is lightly held against the wheel tread 17 being spring actuated in the present embodiment. The brake 21 is continuously in contact with the tread of the wheel member and serves as a scraper for freeing the wheel tire of dirt or foreign matter, which might accumulate on the tire tread in the measurement of terrains where the soil is damp or sticky, such as clay and adobe soils.

Another of the important features and advantages of the invention is the novel arrangement of the elements entering into the functioning of the measurement recording counter F during the traverse of the instrument over the terrain to be measured. The arrangement of the said elements and the means effecting their cooperation with the measurement counter includes the elements 22 situated adjacent the wheel rim 10. The elements 22 in the present embodiment of the invention consist of a series of like projections in the form of studs and/or pins let into one of side faces of the wheel rim 10, this arrangement being more particularly shown in Figs. 1 and 5. The elements 22 are spaced evenly around the wheel rim 10, for example, in the present instance at one foot intervals.

Communication of the projecting elements 22 with the measurement counter is effected by the lever arm 23 as connected to the dial operating shaft 24 of the counter. Numeral 25 denotes a bracket secured to the bracket 17 upon which the counter is set. The bracket 25 is secured on the bracket 17 by two of the screws 18 and is shaped and positioned so as to lie in close proximity to the side face of the wheel member 10 upon which the projecting elements 22 reside. The bracket 25 is fitted with a pair of cushioning bumpers made of rubber or neoprene as denoted by the numerals 25A and 25B, which absorb the shock of the counter lever arm 23 on each end of its stroke. Now, depending from the lower end of the counter lever arm 23 is a hook-like portion 26 in the form of a coiled spring in the present illustrative embodiment of the invention. This hook-like portion 26 and the projecting elements 22 on the face of the wheel member provide the coordinating means by which the measurement counter is operated, the hook end being of length and aligned so as to contact the wheel projections 22 in the forward traverse of the wheel, the projections picking up the hook end of the counter lever arm 23 moving it to record the measurement on the counter. Numeral 27 indicates a knob for resetting the counter.

The counter employed is of the oscillating or ratchet type with a spring actuated shaft 24 working between the bumpers 25A and 25B of the bracket 25. Each time the hook portion 26 of the counter lever arm 23 contacts and passes over a projection 22 of the wheel member the distance traversed is recorded on the counter by a succeeding wheel projection when a further measurement of the wheel traverse is recorded, there being, for example, four evenly spaced projections on the wheel member in the present illustrative embodiment located at one foot intervals so that four readings occur on the measurement recording counter per each revolution of the wheel indicating that four feet have been traversed in the rolling of the wheel over the terrain being measured.

It will, of course, be clear that any number of projecting elements on the wheel member may be used in carrying out the principles of the invention, such that they will trip the counter and record thereon the distance traversed so that when desired the recorded measurements may be made in units of feet or inches.

As shown in Fig. 1 when the instrument is in operative position for the taking of a measurement, the wheel forks C are brought to a substantially vertical position at which time the legs of the wheel stand E take a position well above the surface of the terrain, the angularity between the forks and the legs of the stand being such as to effect a full clearance for the traverse of the wheel over the surface. The handle D is moved in its connection with the cross member 12 of the wheel forks to a comfortable hand position for the operator and locked in position by the tightening of the bolt 15 by its handle 16.

Fig. 2 shows the instrument in folded or out of service position supported on the wheel stand E with the handle D moved well down on its bolted connection with the cross member 12 of the wheel forks; the wheel forks and legs of the stand being substantially perpendicular in this position. The instrument may be rested on the wheel stand at any desired time by the operator during the course of taking measurement—permitting data logging without loss of position. When the measurement operation is to continue the wheel handle is simply returned to the operating position of Fig. 1, the wheel clearing the stand without readjustment of the handle.

It will, of course, be understood that the angularity of the legs of the wheel stand E with respect to the wheel forks C in their fixed relation is such as to carry out the purposes and effects of the invention as pointed out.

It will now be apparent that a simple, practical, and highly efficient measuring wheel instrument is provided by the improvements of the invention and the utility of a device of the character thereby greatly extended and in fact to the extent that greater accuracy may be more expeditiously obtained in the measurement of terrains of extended length than that possible with tapes and like measuring devices where slippages enter into the calculations and which is a laborious and expensive undertaking.

I claim:

1. In a measuring wheel instrument, a wheel member, an axle on which the wheel member is rotatable, a pair of forks connected to the axle, a cross member joining the forks together at their upper ends, a handle movably joined to said cross member by a hinge connection, said handle providing means by which the wheel member may be rolled over a surface to be measured, means for locking said hinge connection upon movement of the handle into a pre-selected position relative to the cross member, a measurement recording counter supported by said cross member closely adjacent the rim of the wheel member with the recording dial thereof facing up and visibly exposed, a brake mounted between the wheel forks and positioned with respect to the tread of the wheel member so that it will have a continuous bearing contact therewith, the brake lifting and the wheel member passing therethrough only during the forward rolling movement of said member, the wheel member having a series of projections evenly spaced around its rim, an actuating arm connected to said counter and extending into the path of travel of said projections and rocked in one direction by said projections upon contact therewith for actuating said counter during the forward rolling movement of the wheel member, a stand for supporting the instrument fixed to the wheel axle at a predetermined angle with respect to said forks, the wheel member passing through the stand and the stand clearing the wheel tread in its fixed position on the wheel axle said handle being formed of a length sufficient to extend to the surface at an angle in a direction opposite to the angle of said stand when said stand is angled to the surface for supporting the instrument in an at-rest position.

2. In a measuring wheel instrument, a wheel member, an axle on which the wheel member is rotatable, a pair of forks connected to the axle, a cross member joining the forks together at their upper ends, a handle adjustably connected to said cross member by a hinge joint and by means of which the wheel member may be rolled over a surface to be measured, means for locking the said joint with the handle in an adjusted pre-selected position relative to the wheel member, a measurement recording counter mounted on said cross member with its dial facing up and visibly exposed, a brake pivotally joined to the wheel forks frictionally engaging the tread of the wheel member, the contact of the brake with the wheel tread being such that the wheel member will rotate while in contact with the brake in its forward traverse and will set against the wheel tread in the reverse movement of the wheel member, the wheel member having a plurality of projections spaced around its rim equidistant from each other and the measurement recording counter having an actuating arm extending into the path of travel of said projections to contact said projections, said projections engaging said arm one at a time as the wheel member is being rotated in a forward direction, a stand for supporting the instrument fixed to the wheel axle at a predetermined angle with respect to said forks and having legs straddling the wheel member, said legs being angularly disposed to the wheel forks and clearing the tread of the wheel member said handle being swingable downwardly and formed of a length sufficient to extend to the surface at an angle opposite the angle of said stand for supporting the instrument at an at-rest position when said stand is angled to the surface.

3. In a measurement wheel instrument, a wheel member, an axle on which the wheel member is mounted to rotate, a pair of forks fixed to the axle and joined together at their upper ends by a cross member, a handle movably joined to said cross member by a hinged connection and by which the wheel member may be rolled over a surface to be measured, said connection having means by which the handle may be fixed in a preselected position relative to the wheel member, a measurement recording counter mounted on said cross portion adjacent to and over the tread of the wheel member with the dial of the counter facing up and visibly exposed, the wheel member having a series of projections evenly spaced around its rim and the counter having an actuating arm in the path of travel of said projections to contact said projections, a brake hung from the wheel forks, spring means lightly holding the brake in frictional contact with the tread of the wheel member, the wheel member being rotatable while the brake is in contact with the wheel tread during the forward rolling movement of the wheel member, and the brake setting against the wheel tread in the reverse movement of the wheel member, said projections one at a time picking up the actuating arm of the counter during the forward rotating movement of the wheel member, then moving past said arm, said instrument having a supporting stand fixed to the axle of the wheel member at a predetermined angle with respect to said forks, said stand straddling the wheel member and the stand clearing the tread of the wheel member said handle being swingable downwardly and formed of a length sufficient to extend to the surface at an angle opposite the angle of said stand for supporting the instrument at an at-rest position when said stand is angled to the surface.

4. In a measuring wheel instrument, a wheel member, an axle on which the wheel is mounted to rotate, a pair of forks fixed to the axle and joined together at their upper ends by a cross member, a handle by means of which the wheel member may be rolled over a surface to be measured, said handle having a yoke end movably joined to said cross member by a hinged connection, a bracket on said cross member and a measurement recording counter positioned on said bracket closely adjacent the tread of the wheel member, the wheel member having a series of evenly spaced projections extending from its rim and the measurement recording counter having an actuating arm in a position to operatively engage said projections one at a time only when the wheel member is rotated in a forward direction, a brake for controlling the movement of the wheel member hung from the wheel forks and engaging the tread of the wheel member, said brake lifting and the wheel member being rotatable therethrough only in a forward direction, a member joined to the wheel forks extending around the measurement recording counter and comprising a guard for said counter, the yoke end of the instrument handle closing over the measurement recording counter when the handle is moved on said hinged connection into a position substantially parallel to the wheel forks, means for locking said connection, a stand for supporting said instrument fixed to the wheel axle, the stand straddling the wheel member, and the wheel member being rotatable through the stand.

5. In a measuring wheel instrument, a wheel member, an axle on which the wheel is mounted to rotate, a pair of forks fixed to the axle and joined together at their upper ends by a cross member, a handle by means of which the wheel member may be rolled over a surface to be measured, said handle having a yoke end movably joined to said cross member by a hinged connection, a bracket on said cross member and a measurement recording counter positioned on said bracket closely adjacent the tread of the wheel member, the wheel member having a series of evenly spaced projections extending from its rim and the measurement recording counter having an actuating arm in a position to operatively engage said projections one at a time only when the wheel member is rotated in a forward direction, a brake for controlling the movement of the wheel member hung from the wheel forks and engaging the tread of the wheel member, said brake lifting and the wheel member being rotatable therethrough only in a forward direction, a member joined to the wheel forks extending around the measurement recording counter and comprising a guard for said counter, the yoke end of the instrument handle closing over the measurement recording counter when the handle is moved on said hinged connection into a position substantially parallel to the wheel forks, means for locking said connection, a stand for supporting said instrument fixed to the wheel axle at a predetermined angle with respect to said forks, the stand straddling the wheel member, and the wheel member being rotatable through the stand, said handle when swung into a position substantially parallel to said wheel forks extending to the surface at an angle opposite the angle of said stand for supporting the instrument at an at-rest position when said stand is angled to the surface.

6. A device of the type described comprising a wheel member, an axle on which the wheel member is mounted, to rotate, a bifurcated member fixed to the axle and straddling the wheel member, a handle by which the wheel member may be rolled over a surface, means for hingedly connecting said handle to said bifurcated member at a point beyond the periphery of said wheel member for swinging movement fore-and-aft in the plane of movement of said wheel member, means for locking said handle against swinging movement in preselected positions with respect to said bifurcated member, a stand for supporting said wheel member fixed to said axle and positioned at a predetermined angle with respect to said bifurcated member, said handle when swung into a position substantially parallel to said bifurcated member extending to the surface at an angle opposite the angle of said stand for supporting the wheel member at an at-rest position when said stand is angled to the surface.

References Cited in the file of this patent
UNITED STATES PATENTS

| | | |
|---|---|---|
| 1,052,054 | Hendren | Feb. 4, 1913 |
| 1,143,467 | Veazey | June 15, 1915 |
| 2,123,360 | Harris | July 12, 1938 |
| 2,452,241 | Jantzen | Oct. 26, 1948 |

FOREIGN PATENTS

| | | |
|---|---|---|
| 266,786 | Great Britain | Mar. 17, 1927 |